(12) United States Patent
Watanabe et al.

(10) Patent No.: US 11,933,745 B2
(45) Date of Patent: Mar. 19, 2024

(54) INSPECTION APPARATUS AND NON-TRANSITORY RECORDING MEDIUM STORING INSPECTION PROGRAM

(71) Applicants: KABUSHIKI KAISHA TOSHIBA, Tokyo (JP); Toshiba Infrastructure Systems & Solutions Corporation, Kawasaki (JP)

(72) Inventors: Yuka Watanabe, Inagi (JP); Takuma Akagi, Tokyo (JP); Masanori Sato, Yamato (JP); Kenichi Shimoyama, Tokyo (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 485 days.

(21) Appl. No.: 17/188,136

(22) Filed: Mar. 1, 2021

(65) Prior Publication Data

US 2021/0181124 A1 Jun. 17, 2021

Related U.S. Application Data

(63) Continuation of application No. PCT/JP2019/034605, filed on Sep. 3, 2019.

(30) Foreign Application Priority Data

Sep. 6, 2018 (JP) ................. 2018-166854

(51) Int. Cl.
*G01N 23/10* (2018.01)
*B07C 5/34* (2006.01)

(52) U.S. Cl.
CPC ........... *G01N 23/10* (2013.01); *B07C 5/3412* (2013.01); *G01N 2223/306* (2013.01); *G01N 2223/309* (2013.01)

(58) Field of Classification Search
CPC ............. G01N 23/10; G01N 2223/306; G01N 2223/309; B07C 5/3412; G06Q 10/083
See application file for complete search history.

(56) References Cited

U.S. PATENT DOCUMENTS

| | | |
|---|---|---|
| 2003/0167240 A1 | 9/2003 | Napier et al. |
| 2006/0243071 A1 | 11/2006 | Sagi-Dolev |
| 2008/0304622 A1* | 12/2008 | Morton ................. G01T 1/2985 378/57 |

FOREIGN PATENT DOCUMENTS

| | | |
|---|---|---|
| EP | 3 273 394 A1 | 1/2018 |
| JP | 2001-306659 A | 11/2001 |

(Continued)

OTHER PUBLICATIONS

International Search Report dated Oct. 1, 2019 in PCT/JP2019/034605 filed Sept. 3, 2019, 2 pages.

*Primary Examiner* — Courtney D Thomas
(74) *Attorney, Agent, or Firm* — Maier & Maier, PLLC (57) ABSTRACT

According to an embodiment, an inspection apparatus includes a communication interface and a processor. The communication interface acquires package information regarding a package being conveyed by a sorter that sorts the package and an operation signal generated based on an operation of an operator. The processor outputs reference information, based on past history in which inspection-result information indicating whether or not the package is a regulated-article candidate, generated based on the operation signal, and the package information are associated together, and the package information newly acquired.

14 Claims, 7 Drawing Sheets

(56) References Cited

FOREIGN PATENT DOCUMENTS

| JP | 2006-505020 A | 2/2006 |
|----|---------------|--------|
| JP | 2008-512689 A | 4/2008 |
| JP | 2013-235407 A | 11/2013 |
| JP | 2018-4363 A | 1/2018 |
| JP | 2018-13939 A | 1/2018 |

\* cited by examiner

INSPECTION APPARATUS AND NON-TRANSITORY RECORDING MEDIUM STORING INSPECTION PROGRAM

CROSS-REFERENCE TO RELATED APPLICATIONS

This application is a Continuation Application of PCT Application No. PCT/JP2019/034605, filed Sep. 3, 2019 and based upon and claiming the benefit of priority from Japanese Patent Application No. 2018-166854, filed Sep. 6, 2018, the entire contents of all of which are incorporated herein by reference.

FIELD

Embodiments of the present embodiment relate to an inspection apparatus and a non-transitory recording medium storing an inspection program.

BACKGROUND

In an inspection system that inspects packages that pass through customs, an operator visually identifies an image of external appearance (external appearance image) of a package supplied to a sorter (sort processing mechanism) and an image with X rays (X-ray image) of the package. The operator determines whether or not the package is required to be verified and inputs an operation to the inspection system. Based on the input operation, the inspection system sorts the package either as a package that is required to be verified or as a package that is not required to be verified.

This method requires the operator to determine the sorting destination of a package, resulting in problems, for example, determination of the sorting destination of a package requires time; a package to be verified is missed; and a package that is not required to be verified is sorted so as to be verified.

DETAILED DESCRIPTION

According to an embodiment, an inspection apparatus includes a communication interface and a processor. The communication interface acquires package information regarding a package being conveyed by a sorter that sorts the package and an operation signal generated based on an operation of an operator. The processor outputs reference information, based on past history in which inspection-result information indicating whether or not the package is a regulated-article candidate, generated based on the operation signal, and the package information are associated together, and the package information newly acquired.

Embodiments will be described below with reference to the drawings.

Figure 1:
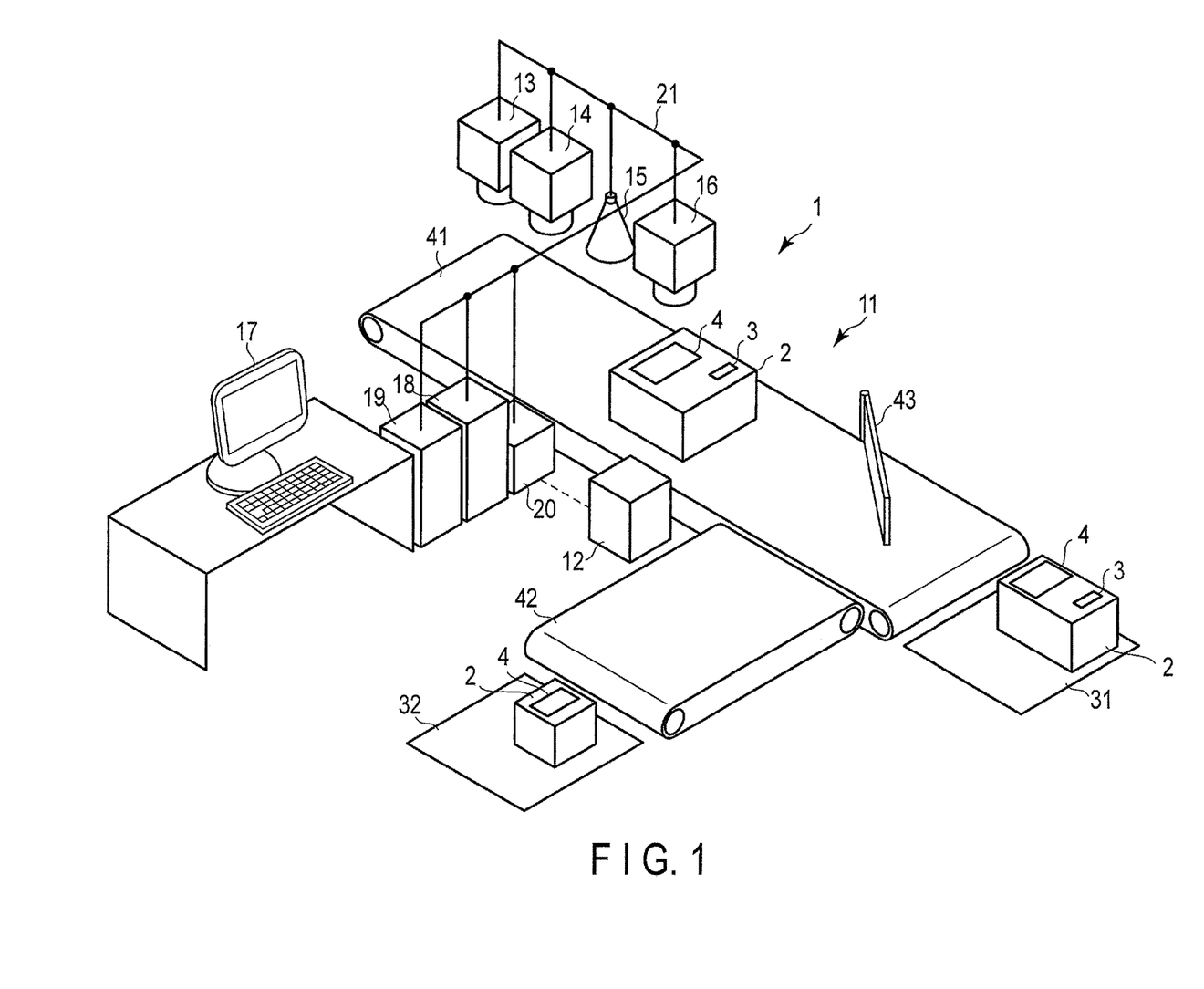
FIG. 1 is an explanatory view for describing an exemplary schematic configuration of an inspection system according to an embodiment.

FIG. 1 is an explanatory view for describing an exemplary schematic configuration of an inspection system 1 according to an embodiment.

The inspection system 1 is a system that sorts a package 2 that is an inspection target. The inspection system 1 is used, for example, in order to find regulated articles in customs or the like. Such regulated articles are regulated in import into the country and in export to foreign countries. Examples of the regulated articles include weapons, drugs, and animals and plants.

The package 2 is inspected by the inspection system 1. The package 2 has an electronic advance data (EAD) tag attached thereto. The EAD tag 3 has an identification code (EAD identification code) included in EAD information indicating an inspection result at customs in a different country, printed thereon. The EAD identification code is printed, for example, as a bar code. The EAD information is information including, for example, the EAD identification code, name-and-address information, and information indicating the item-names and weights of contents (contents information). The name-and-address information includes, for example, information indicating the addressee of the package 2 (delivery destination) (addressee information) and/or information indicating the sender (sender information).

The package 2 has a ledger sheet 4 attached thereto. The ledger sheet 4 has, for example, address-and-name information indicating addressee information and/or sender information and information indicating contents (contents information), recorded therein.

Note that, as illustrated in FIG. 1, for example, present are a package 2 having an EAD tag 3 and a ledger sheet 4 both attached thereto and a package 2 having a ledger sheet 4 attached thereto with no EAD tag 3.

The inspection system 1 includes a sorter 11, a sorter control apparatus 12, an EAD-tag reader 13, a camera 14, an X-ray capturing apparatus 15, a ledger-sheet reader 16, an operation terminal 17, a first storage apparatus 18, a second storage apparatus 19, and an inspection apparatus 20. The sorter 11, the sorter control apparatus 12, the EAD-tag reader 13, the camera 14, the X-ray capturing apparatus 15, the ledger-sheet reader 16, the operation terminal 17, the first storage apparatus 18, the second storage apparatus 19, and the inspection apparatus 20 are mutually communicable through a network 21.

The sorter 11 is an apparatus that sorts a package 2, based on the control of the sorter control apparatus 12. For example, the sorter 11 sorts a package 2 into either a first grouping destination 31 or a second grouping destination 32. The first grouping destination 31 is a grouping destination to which a package 2 not to be verified by an operator is conveyed. The second grouping destination 32 is a grouping destination to which a package 2 to be verified by the operator is conveyed. A package 2 conveyed to the second grouping destination 32 is, for example, opened by the operator for verification.

For example, the sorter 11 includes a first conveyer 41, a second conveyer 42, and a sorting mechanism 43.

The first conveyer 41 conveys a package 2 from the upstream side to the downstream side. A package 2 is supplied to the end portion on the upstream side of the first conveyer 41 by a robot arm or the like. The end portion on the downstream side of the first conveyer 41 is provided with the first grouping destination 31. That is, the first conveyer 41 conveys a package 2 supplied on the upstream side, to the first grouping destination 31.

The second conveyer 42 conveys a package 2 from the upstream side to the downstream side. The end portion on the upstream side of the second conveyer 42 is provided adjacently to the first conveyer 41. The end portion on the downstream side of the second conveyer 42 is provided with the second grouping destination 32. That is, the first conveyer 41 conveys a package 2 supplied on the upstream side, to the second grouping destination 32.

The sorting mechanism 43 is a mechanism of supplying a package 2 being conveyed on the first conveyer 41 to the second conveyer 42. For example, the sorting mechanism 43 includes an arm that pivots to apply a horizontal force to a package 2 being conveyed on the first conveyer 41 such that the package 2 is moved to the second conveyer 42.

Based on the control of the inspection apparatus 20, the sorter control apparatus 12 controls the respective operations of the first conveyer 41 and the second conveyer 42 of the sorter 11 such that a package 2 is conveyed. The sorter control apparatus 12 controls the operation of the sorting mechanism 43 such that the grouping destination of a package 2 is switched between the first grouping destination 31 at the downstream end portion of the first conveyer 41 and the second grouping destination 32 at the downstream end portion of the second conveyer 42.

The EAD-tag reader 13 reads the EAD tag 3 from a package 2 being conveyed by the first conveyer 41. The EAD-tag reader 13 reads the EAD identification code from the EAD tag 3 and supplies the read EAD identification code to the inspection apparatus 20. For example, in a case where the EAD tag 3 has the EAD identification code printed as a bar code thereon, the EAD-tag reader 13 serves, for example, as a bar code reader.

The camera 14 acquires an image of external appearance (external appearance image) of a package 2 being conveyed by the first conveyer 41. The camera 14 supplies the acquired external appearance image of the package 2 to the inspection apparatus 20. For example, the camera 14 includes a combination of a lens and an image pickup element that converts light image-formed by the lens into an image.

The X-ray capturing apparatus 15 acquires an X-ray image of a package 2 being conveyed by the first conveyer 41. The X-ray capturing apparatus 15 supplies the acquired X-ray image of the package 2 to the inspection apparatus 20. For example, the X-ray capturing apparatus 15 includes a combination of an X-ray tube that irradiates a package 2 with X rays and an X-ray detector that detects the X rays having passed through the package 2.

The ledger-sheet reader 16 reads various types of information from the ledger sheet 4 attached to a package 2 being conveyed by the first conveyer 41. For example, the ledger-sheet reader 16 acquires the addressee information, the sender information, and the contents information from the ledger sheet 4. Note that, hereinafter, the addressee information, the sender information, and the contents information acquired from a ledger sheet 4 are referred to as ledger-sheet information. The ledger-sheet reader 16 supplies the ledger-sheet information to the inspection apparatus 20. For example, the ledger-sheet reader 16 includes a line image sensor including an image pickup element and a lens, the image pickup element including pixels that are linearly arrayed and convert light into an image, the lens being to image-form light on the pixels, the line image sensor being to acquire an image of a ledger sheet 4 (ledger-sheet image). The ledger-sheet reader 16 includes a processor that performs optical character recognition processing of recognizing the ledger-sheet information, such as the addressee information, the sender information, and the contents information, from a ledger-sheet image read by the line image sensor.

Next, the operation terminal 17 will be described.

The operation terminal 17 generates a signal (operation signal), based on an input operation, and supplies the operation signal to the inspection apparatus 20. The operation terminal 17 supplies various types of information to the operator.

Figure 2:
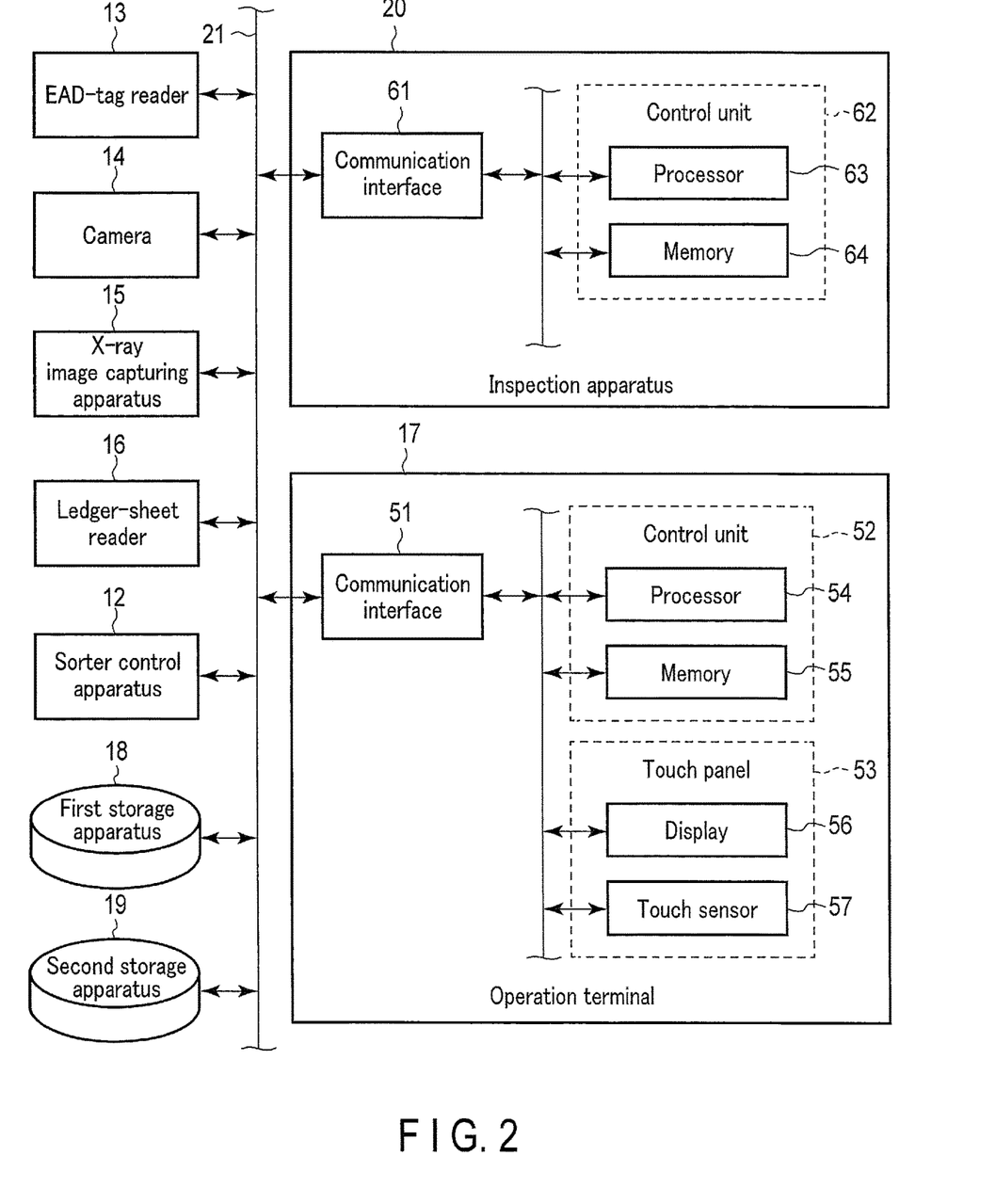
FIG. 2 is an explanatory diagram for describing an exemplary configuration of the inspection system according to the embodiment.

FIG. 2 illustrates respective exemplary configurations of the operation terminal 17 and the inspection apparatus 20. The operation terminal 17 includes a communication interface 51, a control unit 52, and a touch panel 53.

The communication interface 51 is an interface that communicates with equipment different from the operation terminal 17. The communication interface 51 communicates with the inspection apparatus 20 through the network 21.

The control unit 52 is a processing unit that performs various types of processing. The control unit 52 includes a processor 54 and a memory 55.

The processor 54 is an arithmetic element that performs arithmetic processing. The processor 54 is provided, for example, as a CPU. The processor 54 performs various types of processing, based on a program stored in the memory 55.

The memory 55 is a storage medium that stores a program and data. The memory 55 includes, for example, at least any one of a ROM that is a read-only nonvolatile memory, a RAM that temporarily stores data, and a storage that stores data.

The touch panel 53 is an apparatus that displays a screen and generates an operation signal based on an operation. The touch panel 53 includes a display 56 and a touch sensor 57 integrally formed together. The operation terminal 17 may include, instead of the touch panel 53, a display that displays a screen and an operation unit that generates an operation signal based on an operation. The operation unit may be any of a mouse, a trackball, a keyboard, a trackpad, and the like.

The display 56 displays a screen, based on data for display (screen data) supplied from the control unit 52 or a graphics controller not illustrated.

The touch sensor 57 generates an operation signal indicating the position, on the screen displayed on the display 56, touched by the operator operating the operation terminal 17.

Figure 3:
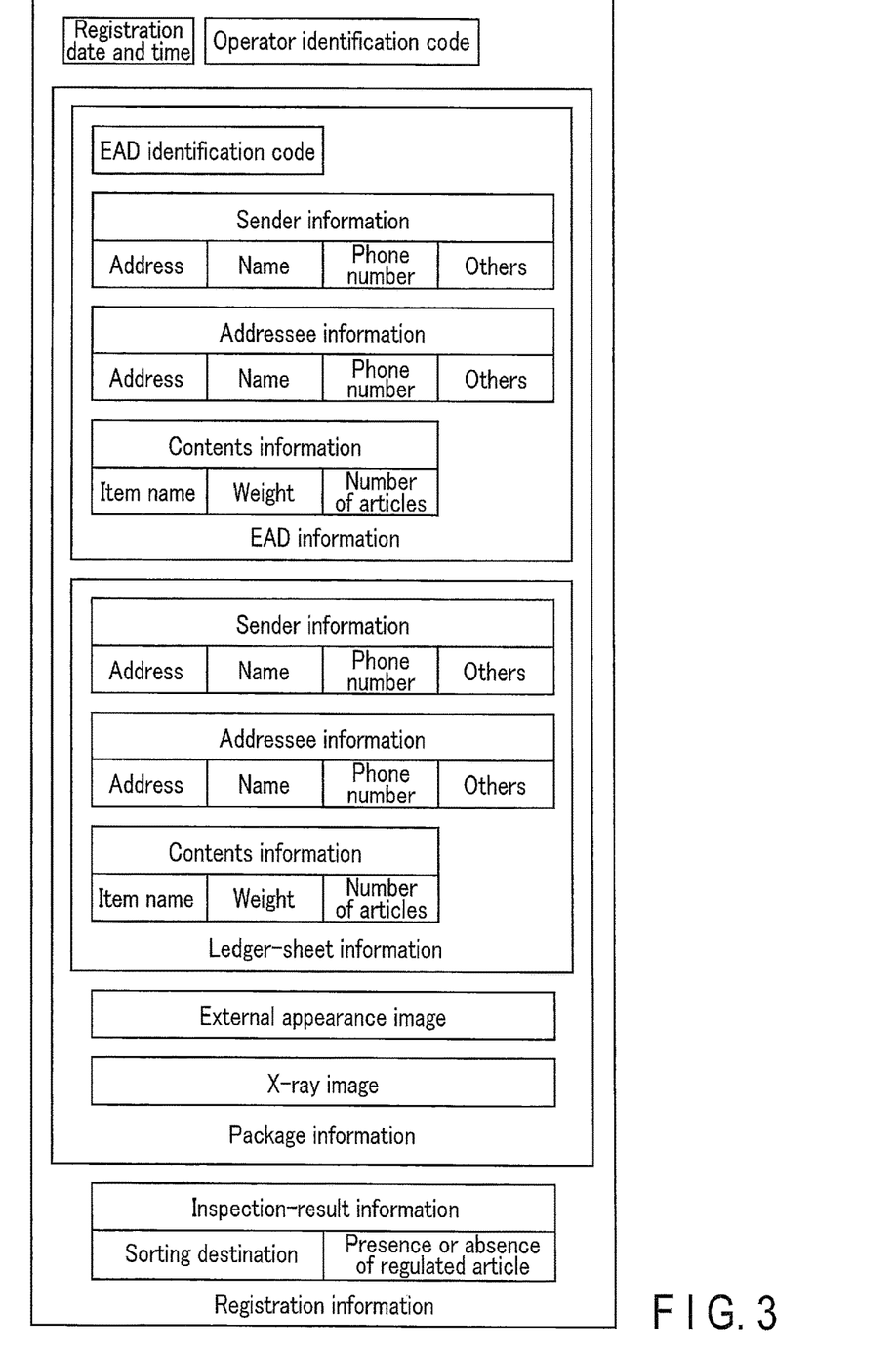
FIG. 3 is an explanatory view for describing exemplary registration information according to the embodiment.

The first storage apparatus 18 stores registration information that is a result of processing in the inspection apparatus 20. FIG. 3 is an explanatory view for describing exemplary registration information. The registration information is past history in which various types of information regarding packages 2 in the past are associated with an inspection result. For example, the registration information includes the registration date and time of registration of the registration information, an operator identification code, package information, and inspection-result information. The operator identification code is a code for identifying the operator. The package information is information regarding a package 2 being conveyed by the sorter 11. The package information includes at least either name-and-address information or an X-ray image. For example, the package information includes EAD information, ledger-sheet information, an external appearance image of the package, and an X-ray image of the package. The inspection-result information includes sorting-destination information and regulated-article presence/absence information input by the operator.

The sorting-destination information is information indicating which of the first grouping destination 31 and the second grouping destination 32 the package 2 has been sorted into. When determining that the contents of the package 2 is not required to be verified, the operator operates the operation terminal 17 such that the package 2 is sorted into the first grouping destination 31. When determining that the contents of the package 2 is required to be verified, namely, the package 2 is a regulated-article candidate, the operator operates the operation terminal 17 such that the package 2 is sorted into the second grouping destination 32. In other words, the sorting-destination information is information indicating whether or not the operator has determined that the package 2 is a regulated-article candidate. The inspection apparatus 20 generates sorting-destination information for each package 2, based on an operation signal generated in accordance with an operation of the operator to the operation terminal 17.

The regulated-article presence/absence information is information indicating whether or not the package 2 includes a regulated article. The operator opens a package sorted in the second grouping destination 32. The operator operates the operation terminal 17 in accordance with whether or not a regulated article is included, based on a result from the opened package 2. As a result, regulated-article presence/absence information is generated in the inspection apparatus 20.

The second storage apparatus 19 stores a database generated based on the registration information stored in the first storage apparatus 18. The database includes, for example, the sender information in the EAD information, the addressee information in the EAD information, the sender information in the ledger-sheet information, or the addressee information in the ledger-sheet information, in association with the past inspection-result information. Specifically, the database enables extraction of the number of packages verified in content and the number of packages including regulated articles in the past, for each piece of sender information or for each piece of addressee information. The database may further include, for example, information indicating the presence or absence of trouble, for each piece of sender information or for each piece of addressee information. Note that the second storage apparatus 19 may be provided together with the first storage apparatus 18 as one storage device.

Next, the inspection apparatus 20 will be described.

As illustrated in FIG. 2, the inspection apparatus 20 includes a communication interface 61 and a control unit 62. The inspection apparatus 20 is an apparatus that supplies information to the operator and distinguishes between a package that is not required to be verified and a package that is required to be verified, based on an operation input by the operator. The operator inputs information for authentication (authentication information) to the inspection apparatus 20, to log in the inspection apparatus 20. Note that, in order to generate such registration information as above, the inspection apparatus 20 adds identification information on the operator having logged in (operator identification code) to the registration information.

The inspection apparatus 20 is achieved by an apparatus capable of performing data processing and data storage, such as a personal computer (PC). The inspection apparatus 20 controls the sorter control apparatus 12 such that a package 2 that is not required to be verified is conveyed to the first grouping destination 31 and a package 2 that is required to be verified is conveyed to the second grouping destination 32. The inspection apparatus 20 includes a communication interface 61 and a control unit 62.

The communication interface 61 is an interface that communicates with other equipment. The communication interface 61 includes a terminal and a circuit that support, for example, a communication standard for communication with the EAD-tag reader 13, the camera 14, the X-ray capturing apparatus 15, the ledger-sheet reader 16, the operation terminal 17, the first storage apparatus 18, and the second storage apparatus 19 through the network 21.

The control unit 62 is a processing unit that performs various types of processing. The control unit 62 includes a processor 63 and a memory 64.

The processor 63 is an arithmetic element that performs arithmetic processing. The processor 63 is provided, for example, as a CPU. The processor 63 performs various types of processing, based on an inspection program stored in the memory 64.

The memory 64 is a storage medium that stores a program and data. The program is a program (inspection program) for causing the processor 63 to perform the processing of inspecting a package 2, to be described later. The memory 64 includes, for example, at least one of a ROM that is a read-only nonvolatile memory and a storage that stores data. That is the memory 64 is a non-transitory recording medium storing the inspection program. The memory 64 may further include a RAM that temporarily stores data.

The memory 64 stores a plurality of pieces of EAD information. For example, the memory 64 stores EAD information imported from a storage medium, such as a USB memory. The memory 64 may store EAD information supplied through a network.

The processor 63 of the control unit 62 in the inspection apparatus 20 executes the program stored in the memory 64, to control the respective operations of the EAD-tag reader 13, the camera 14, the X-ray capturing apparatus 15, and the ledger-sheet reader 16. Thus, the processor 63 acquires an EAD identification code from the EAD-tag reader 13. The processor 63 acquires the external appearance image of a package 2 from the camera 14. The processor 63 acquires the X-ray image of a package 2 from the X-ray capturing apparatus 15. The processor 63 acquires the ledger-sheet information recorded in the ledger sheet 4 attached to a package 2 from the ledger-sheet reader 16.

Based on the EAD identification code acquired from the EAD-tag reader 13, the processor 63 acquires EAD information from the memory 64. The processor 63 extracts, from the memory 64, the EAD information including the EAD identification code acquired from the EAD-tag reader 13. Thus, the processor 63 acquires the EAD information.

Furthermore, based on newly acquired package information and the past history, the processor 63 extracts the package inspection history agreeing on name-and-address information. For example, based on the name-and-address information as the package information, the processor 63 extracts inspection history from the database stored in the second storage apparatus 19. For example, based on the name-and-address information as the package information, the processor 63 may extract inspection history from the past history stored in the first storage apparatus 18. Note that information extracted from the database in the second storage apparatus 19 or the past history in the first storage apparatus 18, based on the name-and-address information, is referred to as extraction information.

The name-and-address information includes at least one of the sender information in the EAD information, the addressee information in the EAD information, the sender information in the ledger-sheet information, and the addressee information in the ledger-sheet information.

The extraction information is information that urges the operator to pay attention, based on the number of packages determined as regulated-article candidates. For example, the extraction information is information generated based on the number of packages determined as regulated-article candidates. For example, the extraction information may be information generated based on the number of packages including regulated articles actually.

Specifically, the processor 63 extracts, from the database, the number of packages verified in content in the past in agreement on sender information and the number of packages including regulated articles in the past in agreement on sender information. The processor 63 extracts, from the database, the number of packages verified in content in the past in agreement on addressee information and the number of packages including regulated articles in the past in agreement on addressee information. The processor 63 may extract, from the database, the number of packages verified in content in the past in agreement on sender information and addressee information and the number of packages including regulated articles in the past in agreement on sender information and addressee information.

The processor 63 estimates the position of a regulated article from the X-ray image, with a parameter generated by machine learning, based on the past history. For example, the processor 63 superimposes an estimation result of the position of a regulated article onto the X-ray image, to generate a candidate image. For example, the processor 63 calculates a score for each predetermined region on the X-ray image, based on the possibility of existence of a regulated article. The processor 63 makes each region in different display, in accordance with the calculated score, to generate a candidate image. For example, the processor 63 displays each region in a different color, in accordance with the calculated score, to generate a candidate image.

The parameter is adjusted based on a large amount of data for learning. The data for learning includes a problem and an answer. The problem and answer in the data for learning are any pieces of data in registration information. In such an example in which the position of a regulated article is estimated from the X-ray image as described above, the X-ray image corresponds to the problem and the position of existence of a regulated article in the X-ray image corresponds to the answer. That is, the parameter is generated by machine learning, for example, with a neural network for segmentation, based on the data for learning including the X-ray image (problem) and the position of a regulated article in the X-ray image (answer).

The processor 63 generates a screen (verification screen) indicating various types of information regarding a package 2 being conveyed by the sorter 11, and transmits the screen to the operation terminal 17 for display. The processor 63 generates a verification screen, based on the EAD information, the ledger-sheet information, the external appearance image, the X-ray image, the candidate image, and the extraction information extracted from the database.

Figure 4:
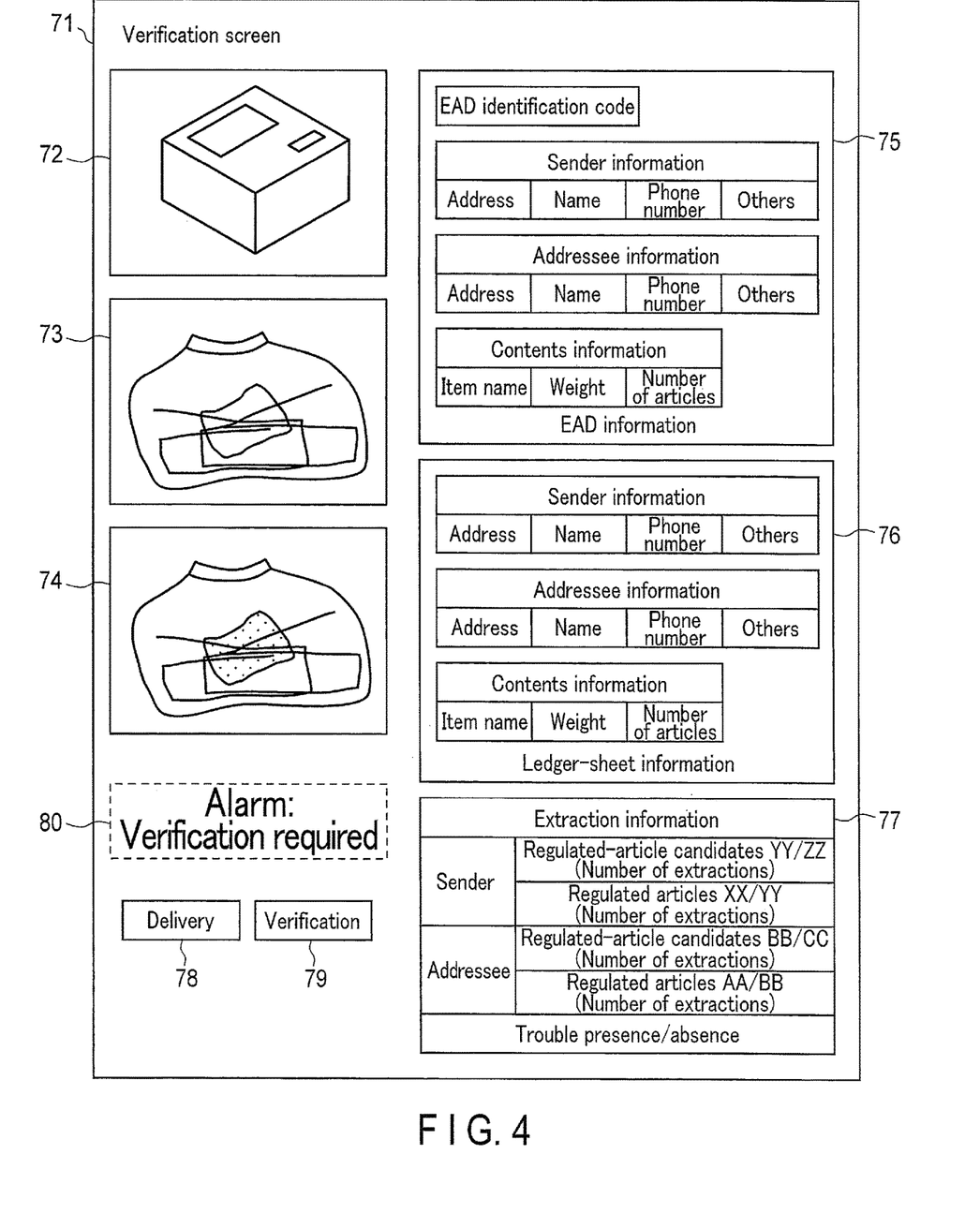
FIG. 4 is an explanatory view for describing an exemplary verification screen according to the embodiment.

FIG. 4 is an explanatory view for describing an exemplary verification screen 71.

The verification screen 71 is a screen displayed on the display 56 of the operation terminal 17. Information for use in determination of whether or not a package 2 is required to be opened for verification, by the operator, is displayed on the verification screen 71. That is, the information displayed on the verification screen 71 is reference information that the operator uses as reference for determination. The verification screen 71 includes, for example, an external appearance image 72, an X-ray image 73, a candidate image 74, EAD information 75, ledger-sheet information 76, extraction information 77, a delivery button 78, and a verification button 79, in display.

The external appearance image 72 is the external appearance image of the package 2 acquired by the camera 14. The X-ray image 73 is the X-ray image of the package 2 acquired by the X-ray capturing apparatus 15. The candidate image 74 is an image generated by the processor 63 based on the X-ray image and the above parameter. The EAD information 75 is EAD information acquired based on the EAD identification code acquired from the package 2 by the EAD-tag reader 13. Note that, in a case where the package 2 has no EAD tag 3 attached thereto, no EAD identification code and no EAD information can be acquired, so that the EAD information 75 is empty in the verification screen 71. The ledger-sheet information 76 is the ledger-sheet information read from the ledger sheet 4 of the package 2 by the ledger-sheet reader 16. That is, the EAD information 75 and the ledger-sheet information 76 include the name-and-address information as the package information.

The extraction information 77 is information extracted from the past history by the processor 63, based on the name-and-address information, as described above.

For example, the extraction information 77 includes information on, for example, the number of packages determined as regulated-article candidates "YY" and the number of packages including regulated articles "XX" from the number of packages agreeing on addressee information with the package 2 being conveying by the sorter 11 "ZZ". The extraction information 77 includes information on, for example, the number of packages determined as regulated-article candidates "BB" and the number of packages including regulated articles "AA" from the number of packages agreeing on addressee information with the package 2 being conveyed by the sorter 11 "CC". The extraction information 77 may further include the presence or absence of trouble in the past regarding the sender or addressee of the package 2 being conveyed by the sorter 11.

The verification screen 71 may further include an alarm display 80. In FIG. 4, as the alarm display 80, the character string "verification required" is displayed on the verification screen 71. For example, in a case where the extraction information satisfies a predetermined condition, the processor 63 displays the alarm display 80 on the verification screen 71. For example, in a case where the number of regulated articles in the extracted information is a previously set threshold or more, the processor 63 displays the alarm display 80 on the verification screen 71. For example, in a case where the number of regulated-article candidates in the extraction information is a previously set threshold or more, the processor 63 displays the alarm display 80 on the verification screen 71. The above conditions may be set by each operator.

The delivery button 78 and the verification button 79 are buttons selectable through the touch sensor 57. The operator verifies the reference information on the verification screen 71 and determines whether or not the package 2 is required to be opened for verification. That is, the operator verifies, for example, the external appearance image 72, the X-ray image 73, the candidate image 74, the EAD information 75, the ledger-sheet information 76, and the extraction information 77 on the verification screen 71 and determines whether or not the package 2 is required to be opened, selecting either the delivery button 78 or the verification button 79.

In a case where the delivery button 78 is selected by the operator, the inspection apparatus 20 determines that the package 2 is not a regulated-article candidate, and controls the sorter control apparatus 12 such that the package 2 is conveyed to the first grouping destination 31.

In a case where the verification button 79 is selected by the operator, the inspection apparatus 20 determines that the package 2 is a regulated-article candidate, and controls the sorter control apparatus 12 such that the package 2 is conveyed to the second grouping destination 32. After that, the operator opens the package conveyed to the second grouping destination 32 and verifies the presence or absence of a regulated article. Then, the operator inputs a result of the verification to the operation terminal 17. Thus, the inspection apparatus 20 generates such registration information as illustrated in FIG. 3. The inspection apparatus 20 saves the generated registration information into the first storage apparatus 18. Thus, the past history accumulates in the first storage apparatus 18. Thus, a database from which the number of packages determined as regulated-article candidates and the number of packages including regulated articles in the past can be extracted with the sender information and the addressee information as indices, can be generated in the second storage apparatus 19.

Next, the operation of the inspection system 1 will be described.

Figure 5:
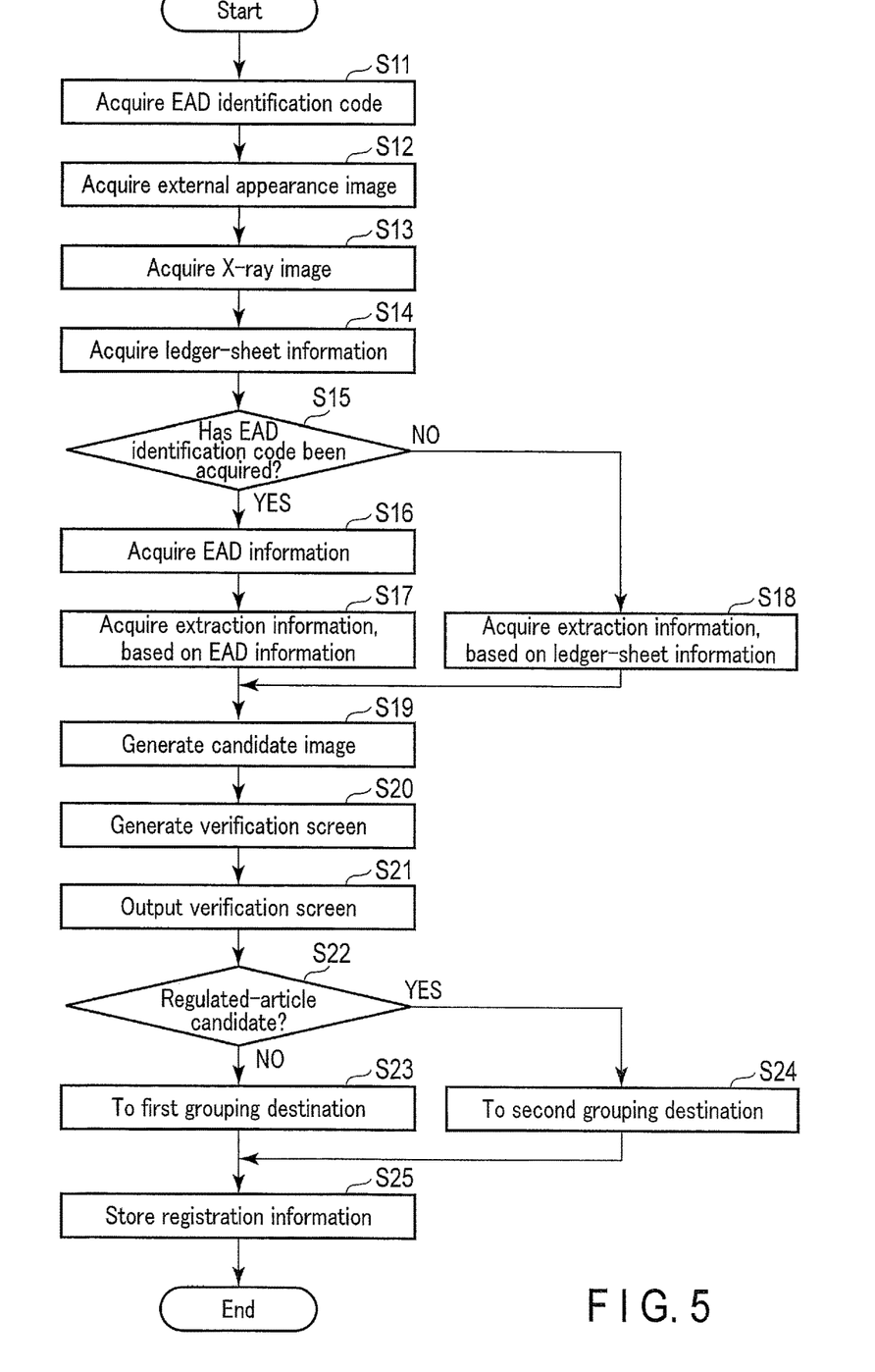
FIG. 5 is a flowchart for describing an exemplary operation of the inspection system according to the embodiment.

FIG. 5 is a flowchart for describing the operation of the inspection system 1.

The EAD-tag reader 13 in the inspection system 1 reads the EAD identification code from the EAD tag 3 of a package 2 being conveyed by the first conveyer 41 (step S11). The EAD-tag reader 13 supplies the EAD identification code to the inspection apparatus 20.

The camera 14 in the inspection system 1 acquires an external appearance image of the package 2 being conveyed by the first conveyer 41 (step S12). The camera 14 supplies the external appearance image to the inspection apparatus 20.

The X-ray capturing apparatus 15 in the inspection system 1 acquires an X-ray image of the package 2 being conveyed by the first conveyer 41 (step S13). The camera 14 supplies the X-ray image to the inspection apparatus 20.

The ledger-sheet reader 16 in the inspection system 1 acquires the ledger-sheet information from the ledger sheet 4 of the package 2 being conveyed by the first conveyer 41 (step S14). The ledger-sheet reader 16 supplies the ledger-sheet information to the inspection apparatus 20.

The processor 63 of the control unit 62 in the inspection apparatus 20 determines whether or not the EAD-tag reader 13 has acquired the EAD identification code (step S15). Thus, the processor 63 determines whether or not the EAD identification code has been supplied from the EAD-tag reader 13.

In a case where it is determined that the EAD-tag reader 13 has acquired the EAD identification code (YES in step S15), the processor 63 acquires EAD information, based on the EAD identification code (step S16). Due to the above processing, the inspection apparatus 20 acquires package information including various types of information regarding the package 2.

Furthermore, based on the EAD information, the processor 63 extracts the extraction information from the database in the second storage apparatus 19 (step S17), and then proceeds to the processing in step S19 to be described later. That is, the processor 63 acquires, from the database, the number of packages in the past, the number of packages determined as regulated-article candidates, and the number of packages determined as including regulated articles, in agreement on the sender information and addressee information in the EAD information.

In a case where it is determined that the EAD-tag reader 13 has acquired no EAD identification code (NO in step S15), the processor 63 acquires the extraction information from the database in the second storage apparatus 19, based on the ledger-sheet information (step S18), and then proceeds to the processing in step S19 to be described later. That is, the processor 63 acquires, from the database, the number of packages in the past, the number of packages determined as regulated-article candidates, and the number of packages determined as including regulated articles, in agreement on the sender information and addressee information in the ledger-sheet information.

With the parameter generated by machine learning, the processor 63 estimates the position of a regulated article from the X-ray image and generates a candidate image (step S19).

Based on the EAD information, the ledger-sheet information, the external appearance image, the X-ray image, the candidate image, and the extraction information extracted from the database, the processor 63 generates the verification screen 71 illustrated in FIG. 4 (step S20). The processor 63 outputs the verification screen 71 to the operation terminal 17 for display (step S21). Thus, the operator visually identifies the verification screen to determine whether or not the package 2 is a regulated-article candidate. When determining that the package 2 is a regulated-article candidate, the operator selects the verification button 79 on the verification screen 71. When determining that the package 2 is not a regulated-article candidate, the operator selects the delivery button 78 on the verification screen 71. Based on a result of selection between the verification button 79 and the delivery button 78 on the verification screen 71, the operation terminal 17 supplies an operation signal to the inspection apparatus 20.

Based on the operation signal from the operation terminal 17, the processor 63 in the inspection apparatus 20 determines whether or not the package 2 is a regulated-article candidate (step S22). For example, in response to reception of the operation signal indicating that the delivery button 78 has been selected, from the operation terminal 17, the processor 63 determines that the package is not a regulated-article candidate. For example, in response to reception of the operation signal indicating that the verification button 79 has been selected, from the operation terminal 17, the processor 63 determines that the package 2 is a regulated-article candidate.

In a case where it is determined that the package 2 is not a regulated-article candidate (NO in step S22), the processor 63 inputs a control signal to the sorter control apparatus 12 such that the package 2 is conveyed to the first grouping destination 31 (step S23). In a case where it is determined that the package 2 is a regulated-article candidate (YES in step S22), the processor 63 inputs a control signal to the sorter control apparatus 12 such that the package 2 is conveyed to the second grouping destination 32 (step S24).

After that, the operator opens the package 2 conveyed to the second grouping destination 32 and verifies the presence or absence of a regulated article. Then, the operator inputs a result of the verification to the operation terminal 17. Based on the above processing result, the processor 63 generates registration information and stores the registration information into the first storage apparatus 18 (step S25), and then terminates the processing. Thus, regulated-article presence/absence information indicating whether or not a regulated article is actually included in the package 2, is added to the registration information. Note that the operator who opens a package 2 conveyed to the second grouping destination 32 may be different from the operator who operates the operation terminal 17. In this case, the inspection system 1 may further include an apparatus to which the operator inputs information as to whether or not a regulated article is included after opening a package 2 conveyed to the second grouping destination 32. That is, the inspection system 1 may further include an apparatus that transmits, to the inspection apparatus 20, information indicating whether or not a regulated article is included, based on an input from the operator.

Note that the registration information may exclude a result of verification of the presence or absence of a regulated article. In this case, the items of the number of regulated articles are omitted from the extraction information 77 on the verification screen 71.

As above, the processor 63 in the inspection apparatus 20 acquires, through the communication interface 61, the package information regarding a package 2 being conveyed by the sorter 11 and the operation signal generated by the operation terminal 17 operated by the operator. Based on the operation signal, the processor 63 generates inspection-result information indicating whether or not the package 2 is a regulated-article candidate. The processor 63 outputs reference information, based on the past history in which the package information on packages 2 in the past and the inspection-result information associated together, and the newly acquired package information. Thus, the inspection apparatus 20 can provide useful information to the operator who determines the sorting destination of a package. As a result, provided can be the inspection apparatus enabling the operator to efficiently determine the sorting destination of a package.

The package information includes the name-and-address information corresponding to the package 2, and the processor 63 generates the reference information, based on the number of packages determined as regulated-article candidates in agreement on the name-and-address information. Thus, the inspection apparatus 20 can provide useful information to the operator who determines the sorting destination of a package.

In response to reception of the operation signal indicating that the package 2 includes a regulated article, the processor 63 adds information indicating that the package 2 includes a regulated article, to the inspection-result information. The processor 63 generates the reference information, based on the number of packages including regulated articles in agreement on the name-and-address information. Thus, the inspection apparatus 20 can provide useful information to the operator who determines the sorting destination of a package.

The processor 63 acquires, through the communication interface 61, EAD information in agreement on the EAD identification code read from the package 2. The processor 63 utilizes, as the name-and-address information, at least either the sender information or addressee information included in the EAD information. Thus, the inspection apparatus 20 can provide useful information to the operator who determines the sorting destination of a package.

The processor 63 acquires, through the communication interface 61, the sender information and addressee information displayed on the package 2. The processor 63 utilizes, as the name-and-address information, at least either the sender information or the addressee information. Thus, even in a case where no EAD tag 3 is attached to the package 2, the inspection apparatus 1 can leave history.

The processor 63 in the inspection apparatus 20 acquires the X-ray image of the package 2 from the X-ray capturing apparatus 15. The processor 63 estimates the position of a regulated article from the X-ray image, with the parameter generated by machine learning. The processor 63 superimposes an estimation result of the position of a regulated article onto the X-ray image, to generate a candidate image. The processor 63 adds the candidate image to the reference information for output. Thus, the operator can be urged to pay attention.

Note that, according to the above embodiment, the verification screen 71 has been described as a screen on which the operator selects either the delivery button 78 or the verification button 79, but this configuration is not limitative. The verification button 79 may be divided by a plurality of reasons for sorting. On the X-ray image, the operator may specify the position of existence of a regulated article.

Figure 6:
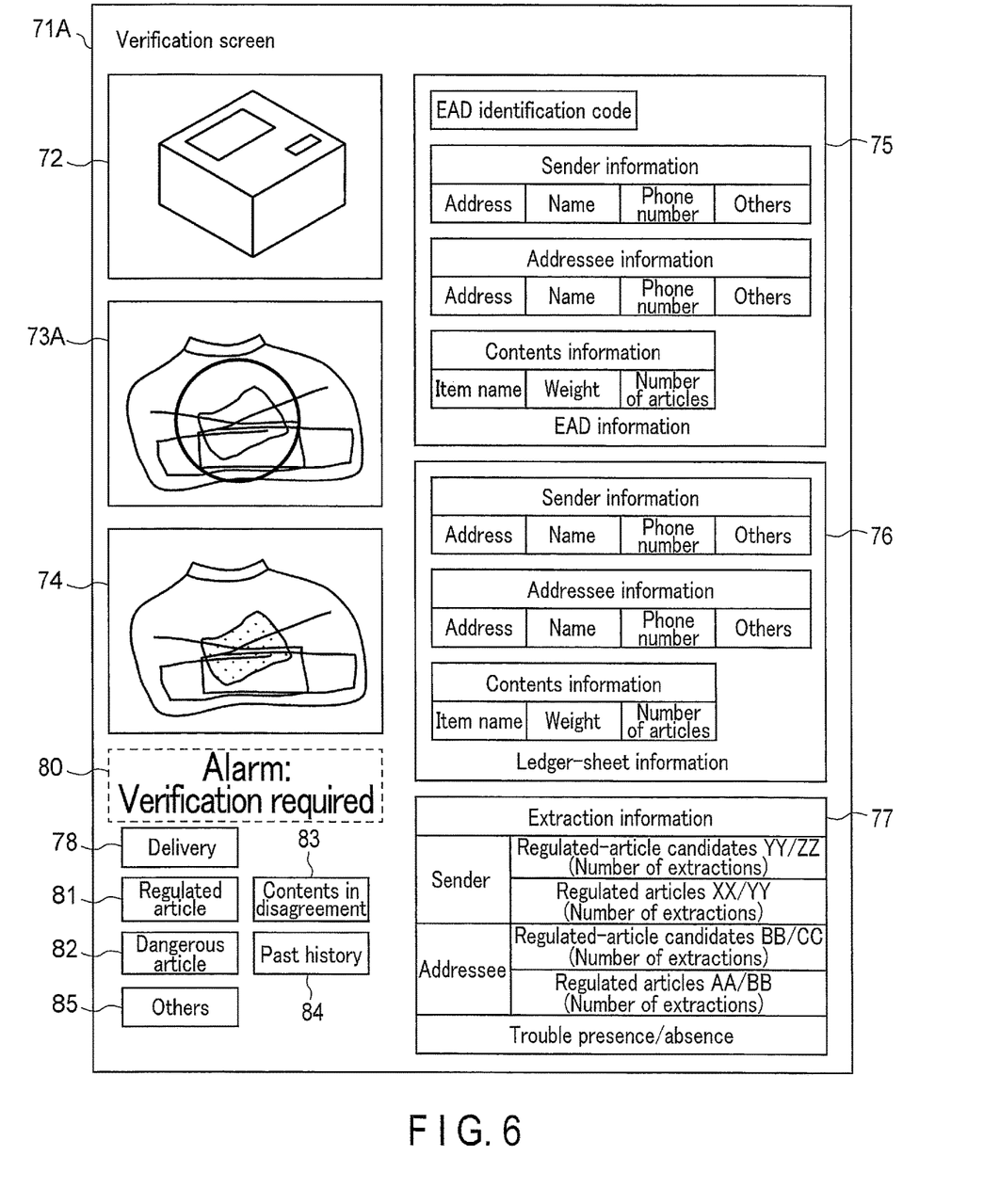
FIG. 6 is an explanatory view for describing an exemplary verification screen according to another embodiment.

FIG. 6 is an explanatory view for describing a verification screen 71A according to another embodiment, different from the verification screen 71 of FIG. 4.

A processor 63 generates the verification screen 71A, based on EAD information, ledger-sheet information, an external appearance image, an X-ray image, a candidate image, and extraction information extracted from a database.

The verification screen 71A is a screen displayed on a display 56 of an operation terminal 17. Information for use in determination of whether or not a package 2 is required to be opened for verification, by an operator, is displayed on the verification screen 71A. That is, the information displayed on the verification screen 71A is reference information that the operator uses as reference for determination. The verification screen 71A includes, for example, an external appearance image 72, an X-ray image 73A, a candidate image 74, EAD information 75, ledger-sheet information 76, extraction information 77, a delivery button 78, a regulated-article button 81, a dangerous-article button 82, a contents-disagreement button 83, a past-history button 84, and a button for others 85, in display.

The operator verifies the reference information on the verification screen 71A and determines whether or not the package 2 is required to be opened for verification, selecting any of the delivery button 78, the regulated-article button 81, the dangerous-article button 82, the contents-disagreement button 83, the past-history button 84, and the button for others 85. The regulated-article button 81, the dangerous-article button 82, the contents-disagreement button 83, the past-history button 84, and the button for others 85 correspond to the verification button 79 on the verification screen 71. That is, in a case where any of the regulated-article button 81, the dangerous-article button 82, the contents-disagreement button 83, the past-history button 84, and the button for others 85 is selected by the operator, an inspection apparatus 20 controls a sorter control apparatus 12 such that the package 2 is conveyed to a second grouping destination 32.

The regulated-article button 81 is a button that is selected in a case where it is determined that the package 2 may possibly include a regulated article as a result of visual identification of the operator to the verification screen 71A.

The dangerous-article button 82 is a button that is selected in a case where it is determined that the package 2 may possibly include a regulated article as a result of visual identification of the operator to the verification screen 71A.

The contents-disagreement button 83 is a button that is selected in a case where it is determined that the package 2 may possibly include an article disagreeing with any article in the package 2 recorded in the EAD information 75 or the ledger-sheet information 76 as a result of visual identification of the operator to the verification screen 71A.

The past-history button 84 is a button that is selected in a case where it is determined that the package is required to be opened for verification due to the extraction information 77 as a result of visual identification of the operator to the verification screen 71A.

The button for others 85 is a button that is selected in a case where the operator has determined that the package 2 is not applicable to the above reasons but is required to be opened for verification.

The X-ray image 73A is the X-ray image of the package 2 acquired by an X-ray capturing apparatus 15. Furthermore, the X-ray image 73A enables a region on the image to be specified through a touch sensor 57. That is, in response to a selection operation (e.g., a tap or drag) of the operator to a region on the X-ray image 73A through the touch sensor 57, the operation terminal 17 generates information indicating the region selected by the operator (X-ray-image regional information).

For example, the operator selects a region estimated to include a regulated article, on the X-ray image 73A. That is, the X-ray-image regional information is information indicating the position of a regulated article in the X-ray image 73A. Thus, generated can be learning data including the X-ray image 73A as the problem and a result of selection of a region by the operator (X-ray-image regional information) as the answer.

Based on a result of a button operation on the verification screen 71A above, the operation terminal 17 supplies an operation signal to the inspection apparatus 20.

In response to reception of the operation signal indicating that the delivery button 78 has been selected, from the operation terminal 17, the processor 63 in the inspection apparatus 20 determines that the package 2 is not a regulated-article candidate. In this case, the processor 63 inputs a control signal to the sorter control apparatus 12 such that the package 2 is conveyed to a first grouping destination 31. Furthermore, the processor generates registration information and then saves the registration information into a first storage apparatus 18.

In response to reception of the operation signal indicating that any of the regulated-article button 81, the dangerous-article button 82, the contents-disagreement button 83, the past-history button 84, and the button for others 85 has been selected, from the operation terminal 17, the processor 63 determines that the package 2 is required to be opened for verification. In this case, the processor 63 inputs a control signal to the sorter control apparatus 12 such that the package 2 is conveyed to the second grouping destination 32.

After that, the operator opens the package 2 conveyed to the second grouping destination 32 and verifies the contents of the package 2. Then, the operator inputs a result of the verification to the operation terminal 17. The processor 63 generates registration information, based on the above processing result. Thus, the generated registration information includes inspection-result information including regulated-article presence/absence information indicating whether or not a regulated article is actually included in the package 2.

The processor 63 adds, to the registration information, information indicating that the package 2 is sorted in the second grouping destination 32 by selection of a button, such as the regulated-article button 81, the dangerous-article button 82, the contents-disagreement button 83, the past-history button 84, or the button for others 85 (sorting-reason information). For example, in a case where the regulated-article button 81 is selected, the processor 63 adds "regulated article" as the sorting-reason information to the registration information. For example, in a case where the dangerous-article button 82 is selected, the processor 63 adds "dangerous article" as the sorting-reason information to the registration information. For example, in a case where the contents-disagreement button 83 is selected, the processor 63 adds "contents in disagreement" as the sorting-reason information to the registration information. For example, in a case where the past-history button 84 is selected, the processor 63 adds "past history" as the sorting-reason information to the registration information. For example, in a case where the button for others 85 is selected, the processor 63 adds "others" as the sorting-reason information to the registration information.

The processor 63 adds, to the registration information, the X-ray-image regional information indicating the position of a regulated article on the X-ray image 73A.

Figure 7:
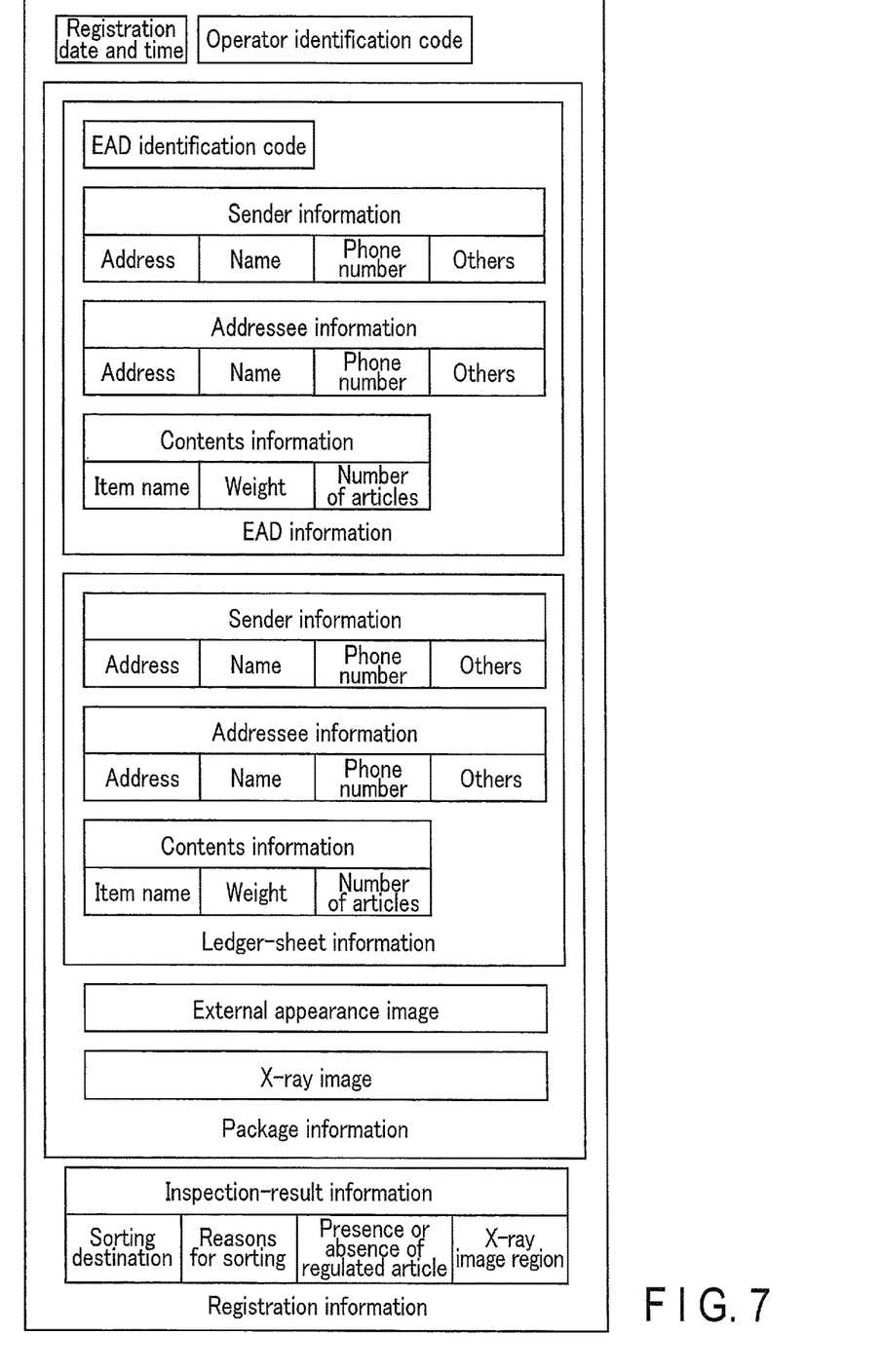
FIG. 7 is an explanatory view for describing exemplary registration information according to another embodiment.

Thus, generated is such registration information as illustrated in FIG. 7. The registration information of FIG. 7 includes the registration date and time of registration of the registration information, an operator identification code, package information, and inspection-result information. The package information is information regarding a package 2 being conveyed by a sorter 11. The package information includes at least either name-and-address information or an X-ray image. For example, the package information includes EAD information, ledger-sheet information, an external appearance image of the package, and an X-ray image of the package. The inspection-result information includes sorting-destination information, sorting-reason information, regulated-article presence/absence information, and X-ray-image regional information input by the operator.

The processor 63 stores, as past history, the registration information generated in the above processing into the first storage apparatus 18. The processor 63 generates a database, based on the past history saved in the first storage apparatus 18, and saves the database into a second storage apparatus 19. For example, the processor 63 associates the sorting-destination information, the sorting-reason information, and the presence or absence of a regulated article together for each piece of name-and-address information, to generate a database. Thus, the processor 63 can generate a database from which the number of packages in the past determined as regulated-article candidates and the number of packages in the past including regulated articles can be each extracted for each reason for sorting, based on the name-and-address information.

Such a configuration enables the processor 63 to generate reference information, based on the number of packages to which the previously set reason for sorting is added, extracted from the past history. That is, the processor 63 can extract, from the database, the number of packages in the past due to the previously set reason for sorting, the number of packages in the past determined as regulated-article candidates due to the previously set reason for sorting, and the number of packages sorted due to the previously set reason for sorting and including regulated articles. Furthermore, the processor 63 can add, as the extraction information 77, extracted information to the verification screen 71A.

In the above embodiment, the following description has been given: the processor 63 acquires the extraction information from the database, based on the name-and-address information, and performs alarm display, based on the extraction information. However, this configuration is not limitative. The processor 63 may determine whether or not to perform alarm display, depending on the sorting-reason information.

For example, in the above embodiment, the processor extracts the extraction information from the second storage apparatus 19, based on the EAD information or the ledger-sheet information. Furthermore, the following description has been given: the processor 63 displays the alarm display 80 on the verification screen 71 in a case where the number of regulated-article candidates in the extraction information is the previously set threshold or more. However, in a case where the reason for sorting is past history, if once the package 2 is determined as a regulated-article candidate, alarm display is repeatedly performed to any package 2 agreeing on name-and-address information. Therefore, the processor 63 may determine whether or not to perform counting as a regulated-article candidate, depending on the reason for sorting. Thus, the processor 63 can count the number of packages sorted as regulated-article candidates due to the previously set reason for sorting, from the number of regulated-article candidates in the extraction information in agreement on name-and-address information.

As above, the registration information of FIG. 7 includes the X-ray image (problem) and the X-ray-image regional information indicating the position of a regulated article on the X-ray image (answer). That is, data for learning can be generated from the registration information. With the data for learning, the inspection apparatus 20 performs machine learning, for example, with a neural network for segmentation, so that updating can be performed in parameter. That is, the parameter can be updated, based on the X-ray-image regional information input by the operator.

Furthermore, the inspection apparatus 20 may set, for each operator, the weight of updating of the parameter in machine learning with the data for learning. The weight is information indicating, for example, the degree of updating of the parameter, the upper limit and lower limit, or a coefficient. As the weight increases, the parameter varies larger in one set of learning. For example, the processor 63 acquires the weight, based on the operator identification code in the registration information. For example, the processor 63 acquires the weight with reference to a table in which the operator identification code added to the registration information and the weight are associated together. The processor 63 updates the parameter, based on the acquired weight and the data for learning. Thus, the data for learning based on the registration information resulting from an operator high in accuracy of detecting a regulated article in the X-ray image can be made to be regarded as of importance at the time of updating of the parameter.

Furthermore, the inspection apparatus 20 may set, for each piece of sorting-reason information, the weight of updating of the parameter with the registration information of FIG. 7. Thus, the data for learning generated based on the registration information with "others", "contents in disagreement", or "past history" as the reason for sorting can be made to be regarded as of no importance at the time of updating of the parameter.

Furthermore, the inspection apparatus 20 may determine whether or not to utilize the registration information of FIG. 7 at the time of updating of the parameter, based on a result of actual verification of the package 2 sorted in the second grouping destination 32. For example, in a case where no regulated article is included as a result of actual verification of the package 2 sorted in the second grouping destination 32, use of the X-ray image (problem) and the X-ray-image regional information (answer) in the registration information is unfavorable in updating of the parameter. Therefore, for example, the inspection apparatus 20 does not necessarily utilize, in updating of the parameter, the registration information indicating that no regulated article is included as a result of actual verification of the package 2 sorted in the second grouping destination 32.

As above, the processor 63 acquires an X-ray image of a package 2 as the package information and outputs the verification screen 71A as the reference information including the X-ray image 73. The operator verifies the X-ray image 73 and gives the operation terminal 17 an input indicating whether or not the package 2 is a regulated-article candidate. Based on the operation signal, the processor 63 generates inspection-result information indicating whether or not the operator has determined that the package 2 is a regulated-article candidate. Furthermore, the processor 63 generates a parameter by machine learning based on the data for learning including the X-ray image as the problem and the inspection-result information as the answer. Such a configuration causes the processor 63 to estimate whether or not the package 2 is a regulated-article candidate, based on the newly acquired X-ray image and the parameter. The processor 63 can add, to the verification screen 71A as the reference information, a result of the estimation of whether or not the package 2 is a regulated-article candidate. Thus, the inspection apparatus 20 can urge the operator to pay attention.

The processor 63 acquires an X-ray image of a package 2 as the package information and outputs the verification screen 71A as the reference information including the X-ray image 73. The operator verifies the X-ray image 73 and determines whether or not the package 2 is a regulated-article candidate. When determining that the package 2 is a regulated-article candidate, the operator inputs the reason that the package 2 is estimated to be a regulated-article candidate (namely, the reason for sorting), to the operation terminal 17. Based on the operation signal, the processor 63 generates inspection-result information indicating whether or not the operator has determined that the package 2 is a regulated-article candidate and the reason for sorting indicating the reason that the package is determined as a regulated-article candidate by the operator. Furthermore, the processor 63 updates the parameter by machine learning based on the data for learning including the X-ray image as the problem and the inspection-result information as the answer. That is, the processor 63 generates a parameter in which the reason for sorting indicating the reason that the package 2 is determined as a regulated-article candidate by the operator is set as the classification destination with the X-ray image as the problem. Such a configuration enables the processor 63 to estimate whether or not the package 2 is a regulated-article candidate and the reason that the package 2 is a regulated-article candidate, based on the newly acquired X-ray image and the parameter. Thus, the processor 63 can add, to the verification screen 71A as the reference information, a result of the estimation of whether or not the package 2 is a regulated-article candidate and the reason that the package 2 is a regulated-article candidate. Thus, the inspection apparatus 20 can urge the operator to pay attention.

The processor 63 acquires an X-ray image of a package 2 as the package information and outputs the verification screen 71A as the reference information including the X-ray image 73. The operator verifies the X-ray image 73 and determines whether or not the package 2 is a regulated-article candidate. When determining that the package 2 is a regulated-article candidate, the operator inputs the reason that the package 2 is estimated to be a regulated-article candidate (namely, the reason for sorting), to the operation terminal 17. When determining that the package 2 is a regulated-article candidate, the operator inputs the position of a regulated article to the operation terminal through the X-ray image 73A. Based on the operation signal, the processor 63 generates inspection-result information indicating whether or not the operator has determined that the package 2 is a regulated-article candidate, the reason for sorting indicating the reason that the package 2 is determined as a regulated-article candidate by the operator, and the X-ray-image regional information indicating the position of a regulated article. Furthermore, the processor 63 updates the parameter by machine learning based on the data for learning including the X-ray image as the problem and the inspection-result information as the answer. That is, the processor 63 generates a parameter for estimating the reason for sorting indicating the reason that the package 2 is determined as a regulated-article candidate by the operator and the position of existence of a regulated article on the X-ray image, with the X-ray image as the problem. In other words, the processor 63 generates a parameter, based on the data for learning including, as the answer, the X-ray-image regional information generated based on an operation of the operator on the X-ray image 73A and the reason for sorting indicating the reason that the package 2 is determined as a regulated-article candidate by the operator. Such a configuration enables the processor 63 to estimate whether or not the package 2 is a regulated-article candidate, the reason that the package 2 is a regulated-article candidate, and the region estimated to include a regulated article on the X-ray image, based on the newly acquired X-ray image and the parameter. Based on the parameter and the newly acquired X-ray image, the processor 63 generates a candidate image indicating the region estimated to include a regulated article on the X-ray image and the reason for sorting. The processor 63 displays the generated candidate image on the verification screen 71A as the reference information. Thus, the inspection apparatus 20 can urge the operator to pay attention.

In updating the parameter by machine learning with the data for learning including the X-ray image as the problem and the position of a regulated article on the X-ray image as the answer, the processor 63 may crop the X-ray image for use in machine learning. For example, the processor 63 crops the X-ray image, based on the X-ray-image regional information, and utilizes the cropped X-ray image as the problem in the data for learning. That is, the processor 63 utilizes, as the problem in the data for learning, the X-ray image in a region selected on the X-ray image by the operator. Thus, because of removal of redundant information from the problem in the data for learning, the inspection apparatus 20 can generate a parameter facilitating detection of a regulated-article candidate.

In the above embodiment, the following description has been given: based on selection of a button, such as the regulated-article button 81, the dangerous-article button 82, the contents-disagreement button 83, the past-history button 84, or the button for others 85, the sorting-reason information, such as "regulated article", "dangerous article", "contents in disagreement", "past history", or "others", is added to the inspection-result information. However, this configuration is not limitative. "Regulated article" and "dangerous article" may be each further divided into various items. For example, "regulated article" may be divided into "particular living body", "designated drug", "gun and gun parts", "counterfeit", and the like. In addition, "dangerous article" may be divided into "explosive article", "explosives", "particular chemical substance", and the like. Division of the sorting-reason information in this manner causes addition of more detailed sorting-reason information to the inspection-result information. Thus, the inspection apparatus 20 can add a more detailed reason for sorting to the reference information.

The above inspection program is not limited in execution to the processor 63 in the inspection apparatus 20. Thus, any apparatus including a communication interface and a processor may execute the inspection program. That is, the inspection program is an inspection program that is executed by a processor in an apparatus including a communication interface and the processor and causes the processor to acquire, through the communication interface, package information regarding a package being conveyed by a sorter that sorts the package and an operation signal generated based on an operation of an operator. The inspection program causes the processor to output the reference information, based on the past history in which the inspection-result information indicating whether or not the package is a regulated-article candidate, generated based on the operation signal, and the package information are associated together, and the newly acquired package information.

As above, the inspection program may be recorded in a non-transitory recording medium such that the inspection program can be read by the apparatus including the processor that executes the inspection program.

The embodiments of the present invention have been described. The embodiments are just exemplary and are not intended to limit the scope of the invention. The new embodiments can be carried out in other various modes, and thus various omissions, replacements, and alternations can be made without departing from the gist of the invention. The embodiments and variations thereof are included in the scope and gist of the invention and are included in the scope of the invention in the claims and equivalents thereof.

What is claimed is:

1. An inspection apparatus comprising:
   a communication interface that acquires package information regarding a package being conveyed by a sorter that sorts the package and an operation signal generated based on an operation of an operator; and
   a processor that outputs reference information, based on past history in which inspection-result information indicating whether or not the package is a regulated-article candidate, generated based on the operation signal, and the package information are associated together, and the package information newly acquired,
   wherein the processor:
   generates, based on an X-ray image of the package and a parameter generated based on data for learning including the X-ray image as a problem and a position of a regulated article on the X-ray image as an answer, a candidate image indicating a region estimated to include the regulated article on the X-ray image, and
   adds the candidate image to the reference information,
   the reference information including: an EAD identification code read by an EAD-tag reader; sender information and addressee information included in the package information; information on regulated-article presence/absence in a past transaction and a past trouble included in a past history; an image captured by a camera; the X-ray image captured by an X-ray image capturing apparatus; and the candidate image.

2. The inspection apparatus according to claim 1, wherein the package information includes name-and-address information corresponding to the package, and the processor generates the reference information, based on a number of the packages each as the regulated-article candidate, extracted from the past history, in agreement on the name-and-address information.

3. The inspection apparatus according to claim 1, wherein the package information includes name-and-address information corresponding to the package, and
the processor
adds, in response to reception of the operation signal indicating that the package includes a regulated article, information indicating that the package includes the regulated article, to the inspection-result information, and
generates the reference information, based on a number of the packages each including the regulated article, extracted from the past history, in agreement on the name-and-address information.

4. The inspection apparatus according to claim 1, wherein the package information includes name-and-address information corresponding to the package, and
the processor
adds, based on the operation signal, a reason for sorting indicating a reason that the package is determined as the regulated-article candidate by the operator, to the inspection-result information, and
generates the reference information, based on a number of the packages each having the reason for sorting previously set, extracted from the past history.

5. The inspection apparatus according to claim 1, wherein the package information includes the X-ray image of the package, and
the processor
generates the inspection-result information indicating whether or not the operator has determined that the package is the regulated-article candidate, based on the operation signal generated based on an input of whether or not the package is the regulated-article candidate, resulting from verification of the X-ray image by the operator, and
generates the reference information, based on a parameter generated based on data for learning including the X-ray image as a problem and the inspection-result information as an answer, and the X-ray image newly acquired.

6. The inspection apparatus according to claim 5, wherein the processor
adds, based on the operation signal, a reason for sorting indicating a reason that the package is determined as the regulated-article candidate by the operator, to the inspection-result information, and
adds, based on the parameter and the X-ray image, a reason that the package is estimated to be the regulated-article candidate, to the reference information.

7. The inspection apparatus according to claim 5, wherein the processor updates the parameter, based on the data for learning.

8. The inspection apparatus according to claim 7, wherein the processor adds, to the inspection-result information, an operator identification code for identifying the operator, and
the processor updates the parameter with a different weight for each of the operators having generated the data for learning.

9. The inspection apparatus according to claim 1, wherein the data for learning is data generated based on an operation of the operator on the X-ray image, the data including, as the answer, X-ray-image regional information indicating a region on the X-ray image.

10. The inspection apparatus according to claim 1, wherein
the data for learning is data generated based on an operation of the operator on the X-ray image, the data including, as the answer, X-ray-image regional information indicating a region on the X-ray image and a reason for sorting indicating a reason that the package is determined as the regulated-article candidate by the operator.

11. The inspection apparatus according to claim 10, wherein
the processor generates, based on the parameter and the X-ray image, the candidate image indicating the region estimated to include the regulated-article candidate on the X-ray image and the reason for sorting.

12. The inspection apparatus according to claim 1, wherein
the communication interface acquires name-and-address information from sender information and addressee information displayed on the package.

13. The inspection apparatus according to claim 1, wherein
the communication interface acquires, from a recording medium storing a plurality of pieces of EAD information including sender information and addressee information in advance, EAD information in agreement on an EAD identification code read from the package, and acquires name-and-address information included in the acquired EAD information, and
the package information includes at least either the sender information or the addressee information for the name-and-address information.

14. A non-transitory recording medium storing an inspection program that an inspection apparatus including a communication interface and a processor executes, the inspection program causing the inspection apparatus to perform:
acquiring, by the communication interface, package information regarding a package being conveyed by a sorter that sorts the package and an operation signal generated based on an operation of an operator; and
outputting, by the processor, reference information, based on past history in which inspection-result information indicating whether or not the package is a regulated-article candidate, generated based on the operation signal, and the package information are associated together, and the package information newly acquired,
wherein the processor:
generates, based on an X-ray image of the package and a parameter generated based on data for learning including the X-ray image as a problem and a position of a regulated article on the X-ray image as an answer, a candidate image indicating a region estimated to include the regulated article on the X-ray image, and
adds the candidate image to the reference information,
the reference information including: an EAD identification code read by an EAD-tag reader; sender information and addressee information included in the package information; information on regulated-article presence/absence in a past transaction and a past trouble included in the past history; an image captured by a camera; the X-ray image captured by an X-ray image capturing apparatus; and the candidate image.

* * * * *